Patented Nov. 8, 1949

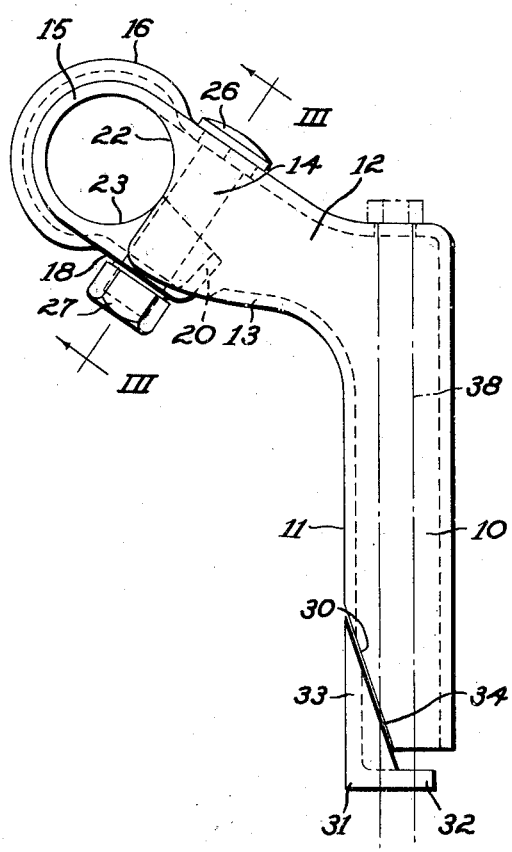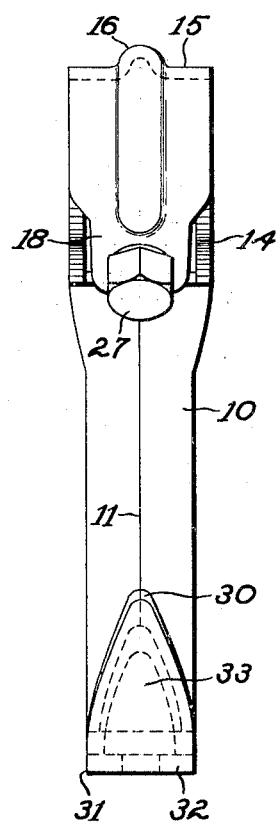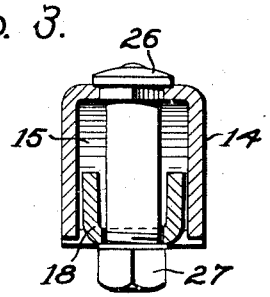

2,487,661

UNITED STATES PATENT OFFICE 2,487,661

HANDLE BAR SUPPORT

Herbert J. McCauley, Jr., Buffalo, N. Y.

Application July 25, 1946, Serial No. 686,119

10 Claims. (Cl. 74—551.6)

This invention relates to a novel handlebar supporting and clamping element for bicycles or other velocipedes.

Such elements normally comprise a shank or pin portion and an integral offset handlebar receiving bearing at the upper end thereof. Prior art practice is to cast or forge such elements in a single piece and various machining and finishing operations subsequent to casting or forging are required to bring the completed part to proper size and surface finish.

According to the present invention, a unitary element of this class is made by forming a single sheet metal blank into novel form which fully meets all of the requirements of a conventional element of this class. Obviously, since all of the blanking and forming operations are carried out on conventional sheet metal stamping machines, the device of the present invention lends itself readily to mass production. No subsequent finishing or machining operations are required. Further, the devices are in final finished form when the final punch press or similar operation is performed, there being no intermediate or subsequent welding or other securement required.

Besides the obvious economy of manufacture on a mass production basis, the element of the present invention is superior to the cast or forged elements of the prior art by virtue of its inherent resilience, it being practically immune to fracture and having a high resistance to permanent deformation.

Other objects and advantages will occur to those skilled in the arts to which the present invention pertains. While a specific mode of practicing the invention is set forth herein by way of example and illustrated in detail in the drawing, it is to be understood that the invention is limited only as defined in the appended claims.

In the drawing:

Fig. 1 is a side elevational view of a finished stamping comprising one form of the handlebar support of the present invention with a handlebar clamping bolt and nut assembled therewith and with a clamping wedge element shown in related engagement therewith;

Fig. 2 is a front elevational view of the device of Fig. 1, viewed from the left as shown in Fig. 1; and Fig. 3 is a cross sectional view taken on the line III—III of Fig. 1.

Referring to Figs. 1 and 2, the stamping there shown comprises a portion 10 press-formed into tubular shape, the opposite sides of the blank being brought together as at 11 to complete the tubular formation. The gauge and strength of the metal employed is adequate to provide a strictly rigid tubular portion 10 without the necessity for welding or otherwise securing or reinforcing such portion. At its upper end, tubular portion 10 has an offset portion 12, likewise tubular in cross section and having the opposite edges of the portion of the blank from which it is formed brought inwardly to substantially meet as at 13.

Beyond this tubular offset portion the stamping extends along in a portion 14 of channel cross section shown in detail in Fig. 3. Beyond the channel portion the stamping comprises an arcuate band portion 15, preferably with a reinforcing peripheral bead 16. The terminal portion of the stamping beyond the band portion 15 comprises a second channel portion 18 which fits within channel portion 14, likewise as shown in detail in Fig. 3. The side walls of channel portion 18 extend continuously around the end of stamping to form a unitary arcuate end wall 20 which greatly strengthens this portion of the stamping.

It will be noted that the walls of channel portions 14 and 18 are arcuate as at 22 and 23, respectively, to continue the arc formed by band portion 15, whereby a handlebar of circular cross section placed therein has a full circular bearing seat. A stove bolt 26 seats in a square opening formed in the web of channel portion 14 and extends through a clearance hole formed in the web of channel portion 18 for cooperation with a clamping nut 27. The natural resilience of the steel from which the stamping is formed is adequate to permit resilient flexure of band portion 15 the slight amount required to securely clamp a handlebar in association therewith.

The lower end of tubular portion 10 is beveled off as at 30 for cooperation with a stamping 31 having an end flange 32 and an arcuate portion 33 which has a complementary beveled surface 34. A screw 38 is shown in dot and dash lines in Fig. 1, and its lower end may thread into end wall 32 of stamping 31 to draw stamping 31 upwardly as viewed in Fig. 1. Since the tubular portion 10 and stamping 31 extend within the upper journal of a velocipede fork, for instance, this tightening action wedges tubular portion 10 and stamping 31 securely within such journal so that the stamping and the handlebar associated therewith rotate as a unit with the velocipede fork about the axis of tubular portion 10. The velocipede fork journal rotates freely within the head of the velocipede frame in an entirely conventional manner.

For facility of manufacture, channel portions 14 and 18 are formed while the portion of the blank which ultimately comprises the band 15 is still in a relatively flat state. Subsequently, when the blank is formed to produce arcuate band 15, channel portion 18 is automatically projected between the flanges of channel portion 14 as shown clearly in Figs. 1 and 3.

What is claimed is:

1. In a handlebar support for velocipedes and the like, a stamping formed from a single sheet metal blank of elongated outline and including a tubular stem portion wherein the opposed side edges of the blank adjacent one end thereof are substantially in abutment, a tubular portion at the end of the stem portion which is opposite said end of the blank and offset in the direction of said abutting edges, said offset tubular portion likewise having the adjacent side edges of the blank in abutment continuously with the edge abutment of the stem portion, said stamping having a channel portion beyond but substantially continuous with said offset tubular portion, said stamping beyond said channel being return bent to provide an arcuate band having its axis at right angles to the axis of the stem portion, said two axes lying in parallel planes, said stamping terminating beyond said band in a channel portion having its flanges directed toward and interfitting with the flanges of the first mentioned channel portion, and a clamping nut and bolt passing through the webs of the two channel portions for clamping said band about a handlebar.

2. In a handlebar support for velocipedes and the like, a stamping formed from a single sheet metal blank of elongated outline and including a tubular stem portion wherein the opposed side edges of the blank adjacent one end thereof are substantially in abutment, a tubular portion at the end of the stem portion which is opposite said end of the blank and offset in the direction of said abutting edges, said offset tubular portion likewise having the adjacent side edges of the blank in abutment continuously with the edge abutment of the stem portion, said stamping beyond said offset tubular portion being return bent to provide an arcuate band having its axis at right angles to the axis of the stem portion, said two axes lying in parallel planes, said stamping terminating beyond said band in a portion projecting toward said stem portion, and a clamping nut and bolt passing through said stamping at opposite sides of said band for clamping said band about a handlebar.

3. In a handlebar support for velocipedes and the like, a stamping formed from a single sheet metal blank of elongated outline and including a tubular stem portion wherein the opposed side edges of the blank adjacent one end thereof are substantially in abutment, a tubular portion at the end of the stem portion which is opposite said end of the blank and offset in the direction of said abutting edges, said offset tubular portion likewise having the adjacent side edges of the blank in abutment continuously with the edge abutment of the stem portion, said stamping having a channel portion beyond but substantially continuous with said offset tubular portion, said stamping beyond said channel being return bent to provide an arcuate band having its axis at right angles to the axis of the stem portion, said two axes lying in parallel planes, said stamping terminating beyond said band in a channel portion having its flanges directed toward and interfitting with the flanges of the first mentioned channel portion, said terminal channel portion having its flanges merging in an end wall portion to form a continuous reinforcing flange about said end, and a clamping nut and bolt passing through the webs of the two channel portions for clamping said band about a handlebar.

4. In a handlebar support for velocipedes and the like, a stamping formed from a single sheet metal blank of elongated outline and including a tubular stem portion wherein the opposed side edges of the blank adjacent one end thereof are substantially in abutment, a tubular portion at the end of the stem portion which is opposite said end of the blank and offset in the direction of said abutting edges, said offset tubular portion likewise having the adjacent side edges of the blank in abutment continuously with the edge abutment of the stem portion, said stamping having a channel portion beyond but substantially continuous with said offset tubular portion, said stamping beyond said channel being return bent to provide an arcuate band having its axis at right angles to the axis of the stem portion, said two axes lying in parallel planes, said stamping terminating beyond said band in a channel portion having its flanges directed toward and interfitting with the flanges of the first mentioned channel portion, the edges of the channel portions adjacent the arcuate band being arcuate concentrically with said band to provide a full circular clamping bearing, and a clamping nut and bolt passing through the webs of the two channel portions for clamping said band about a handlebar.

5. In a handlebar support for velocipedes and the like, a stamping formed from a single sheet metal blank of elongated outline and including a tubular stem portion wherein the opposed side edges of the blank adjacent one end thereof are substantially in abutment, a tubular portion at the end of the stem portion opposite said end of the blank and offset in the direction of said abutting edges, said offset tubular portion likewise having the adjacent side edges of the blank in abutment continuously with the edge abutment of the stem portion, to form a continuous seam in the common central plane of the two tubular portions, said stamping having clamp means formed unitarily therewith at the terminus of said offset tubular portion.

6. In a handlebar support for velocipedes and the like, a stamping comprising a single continuous piece of sheet metal formed to include a hollow tubular stem portion, an offset tubular portion at one end thereof, a circular band beyond said offset tubular portion, said band having an axis at right angles to the axis of the first mentioned tubular portion, and a portion projecting from the end of said band back toward the first mentioned tubular portion, whereby a clamping bolt may be applied across the stamping at opposite sides of the band portion.

7. In a handlebar support for velocipedes and the like, a stamping comprising a single continuous piece of sheet metal formed to include a hollow tubular stem portion, an offet tubular portion at one end thereof, a circular band beyond said offset tubular portion, said band having an axis at right angles to the axis of the first mentioned tubular portion, said two axes lying in spaced parallel planes, and a portion projecting from the end of said band back toward the first mentioned tubular portion, whereby a clamping bolt may be applied across the stamping at opposite sides of the band portion.

8. In a handlebar support for velocipedes and the like, a stamping comprising a single continuous piece of sheet metal formed to include a hollow tubular stem portion, an offset tubular portion at one end thereof, a channel portion at the terminus of said offset tubular portion and a circular band at the terminus of said channel portion, said band having an axis at right angles to the axis of the first mentioned tubular portion, and a portion projecting from the end of said band back toward the first mentioned tubular portion and fitting between the flanges of said channel portion, whereby a clamping bolt may be applied across the channel portion and said projecting end portion adjacent the band portion.

9. In a handlebar support for velocipedes and the like, a stamping comprising a single continuous piece of sheet metal formed to include a hollow tubular stem portion, an offset tubular portion at one end thereof, a channel portion at the terminus of said offset tubular portion and a circular band at the terminus of said channel portion, said band having an axis at right angles to the axis of the first mentioned tubular portion, and a channel portion projecting from the end of said band back toward the first mentioned tubular portion, whereby a clamping bolt may be applied across the webs of the two channel portions adjacent the band portion, the flanges of said two channel portions being disposed to interfit.

10. In a handlebar support for velocipedes and the like, a stamping comprising a single continuous piece of sheet metal formed to include a hollow tubular stem portion, an offset tubular portion at one end thereof, a channel portion at the terminus of said offset tubular portion and a circular band portion at the terminus of said channel portion, said band having an axis at right angles to the axis of the first mentioned tubular portion, and a channel portion projecting from the end of said band back toward the first mentioned tubular portion with its flanges extending between the flanges of the first channel portion, whereby a clamping bolt may be applied across the webs of the two channel portions to clamp the opposite ends of the band portion.

HERBERT J. McCAULEY, Jr.

REFERENCES CITED

The following references are of record in the file of this patent:

UNITED STATES PATENTS

| Number | Name | Date |
| --- | --- | --- |
| 1,791,985 | Van Valkenburg | Feb. 10, 1931 |

FOREIGN PATENTS

| Number | Country | Date |
| --- | --- | --- |
| 331,445 | Great Britain | July 3, 1930 |